(12) United States Patent
Bai et al.

(10) Patent No.: US 10,957,348 B2
(45) Date of Patent: *Mar. 23, 2021

(54) MAGNETIC RECORDING WRITE HEAD WITH SELECTED WRITE GAP CURRENT DIRECTION FOR MINIMIZATION OF CROSS-TRACK INTERFERENCE

(71) Applicant: Western Digital Technologies, Inc., San Jose, CA (US)

(72) Inventors: Zhigang Bai, Fremont, CA (US); Alexander Taratorin, Palo Alto, CA (US); Anna Zheng, San Jose, CA (US); Venkatesh Chembrolu, Fremont, CA (US); Supradeep Narayana, Santa Clara, CA (US); Suping Song, Fremont, CA (US); Yaguang Wei, Pleasanton, CA (US); Terence Lam, Cupertino, CA (US); Michael Kuok San Ho, Emerald Hills, CA (US); Changqing Shi, San Ramon, CA (US); Lijie Guan, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,143

(22) Filed: Jun. 24, 2020

(65) Prior Publication Data

US 2020/0327900 A1  Oct. 15, 2020

Related U.S. Application Data

(63) Continuation of application No. 16/277,947, filed on Feb. 15, 2019, now Pat. No. 10,699,734, which is a (Continued)

(51) Int. Cl.
*G11B 5/11* (2006.01)
*G11B 5/31* (2006.01)
(Continued)

(52) U.S. Cl.
CPC ............ *G11B 5/315* (2013.01); *G11B 5/1278* (2013.01); *G11B 5/147* (2013.01); *G11B 5/23* (2013.01);
(Continued)

(58) Field of Classification Search
None
See application file for complete search history.

(56) References Cited

U.S. PATENT DOCUMENTS 7,072,142 B2   7/2006  Lam
7,982,996 B2   7/2011  Smith et al.
(Continued)

FOREIGN PATENT DOCUMENTS

CN   104835510 B   11/2017
JP   2013251042 A  12/2013
WO  2015126326 A1   8/2015

OTHER PUBLICATIONS

Ikuya Tagawa et al.; "Advantage of MAMR Read-Write Performance" IEEE Transactions on Magnetics, vol. 52, Issue No. 9; Sep. 2016 (3 pages).

(Continued)

Primary Examiner — Craig A. Renner
(74) Attorney, Agent, or Firm — Patterson & Sheridan, LLP; Steven H. Versteeg (57) ABSTRACT

A magnetic recording write head has an electrically-conductive structure in the write gap between the write pole and the trailing shield and electrical circuitry for directing current through the write gap. The current through the electrically-conductive structure generates a circular Ampere field
(Continued)

which, at the disk-facing end of the write pole, is substantially parallel to the disk-facing end of the write pole. The electrically-conductive structure in the write gap may be a STO or an electrically-conductive layer that is not part of a STO. The current direction through the electrically-conductive structure in the write gap is selected so that the generated Ampere field at the write pole end is in substantially the same direction as the magnetization direction of the write head side shields, which has been discovered to result in minimization of cross-track interference.

20 Claims, 7 Drawing Sheets

Related U.S. Application Data continuation of application No. 16/191,330, filed on Nov. 14, 2018, now abandoned, which is a continuation of application No. 16/144,796, filed on Sep. 27, 2018, now abandoned.

(60) Provisional application No. 62/580,697, filed on Nov. 2, 2017.

(51) Int. Cl.
*G11B 5/235* (2006.01)
*G11B 5/147* (2006.01)
*G11B 5/23* (2006.01)
*G11B 5/127* (2006.01)
*G11B 5/00* (2006.01)

(52) U.S. Cl.
CPC ............ *G11B 5/235* (2013.01); *G11B 5/3146* (2013.01); *G11B 2005/0024* (2013.01)

(56) References Cited

U.S. PATENT DOCUMENTS

| | | |
|---|---|---|
| 8,116,031 B2 | 2/2012 | Alex et al. |
| 8,456,967 B1 | 6/2013 | Mallary |
| 8,553,362 B2 | 10/2013 | Tanabe et al. |
| 8,582,240 B1 | 11/2013 | Chen et al. |
| 8,810,946 B2 | 8/2014 | Yasui et al. |
| 8,937,783 B2 | 1/2015 | Albrecht et al. |
| 8,970,996 B2 | 3/2015 | Nagasaka et al. |
| 9,007,723 B1 | 4/2015 | Igarashi et al. |
| 9,230,571 B1 | 1/2016 | Chen et al. |
| 9,275,672 B2 | 3/2016 | Shiroishi et al. |
| 9,311,934 B1 | 4/2016 | Shiimoto et al. |
| 9,355,659 B2 | 5/2016 | Koui et al. |
| 9,368,135 B2 | 6/2016 | Gao |
| 9,881,637 B1 | 1/2018 | Wilson et al. |
| 10,121,497 B1 | 11/2018 | Takahashi et al. |
| 10,186,284 B2 | 1/2019 | Narita et al. |
| 10,236,021 B2 | 3/2019 | Narita et al. |
| 10,276,193 B2 | 4/2019 | Narita et al. |
| 10,325,618 B1 | 6/2019 | Wu et al. |
| 10,366,714 B1 | 7/2019 | Olson et al. |
| 2006/0098334 A1* | 5/2006 | Jayasekara et al. ... G11B 5/315 360/125.17 |
| 2008/0304176 A1 | 12/2008 | Takagishi et al. |
| 2009/0059423 A1 | 3/2009 | Yamada et al. |
| 2009/0310244 A1 | 12/2009 | Shimazawa et al. |
| 2011/0075294 A1* | 3/2011 | Fuchizaki et al. ...... G11B 5/315 360/123.12 |
| 2012/0026628 A1* | 2/2012 | Li et al. ................ G11B 5/315 360/123.12 |
| 2012/0092787 A1* | 4/2012 | Koizumi .............. G11B 5/1278 360/123.01 |
| 2013/0250456 A1 | 9/2013 | Yamada et al. |
| 2013/0314818 A1* | 11/2013 | Maatsumoto et al. ...................... G11B 5/3146 360/125.03 |
| 2014/0078618 A1* | 3/2014 | Matsumoto et al. ...................... G11B 5/1278 360/119.02 |
| 2014/0139952 A1 | 5/2014 | Takeo et al. |
| 2014/0177100 A1* | 6/2014 | Sugiyama et al. ... G11B 5/1278 360/125.03 |
| 2015/0228296 A1 | 8/2015 | Taguchi |
| 2016/0027455 A1 | 1/2016 | Kudo et al. |
| 2017/0186452 A1 | 6/2017 | Matsumoto et al. |
| 2017/0236537 A1 | 8/2017 | Murakami et al. |
| 2018/0268848 A1 | 9/2018 | Narita et al. |
| 2019/0088274 A1 | 3/2019 | Narita et al. |

OTHER PUBLICATIONS

Zhu et al. "Microwave Assisted Magnetic Recording," IEEE Transactions on Magnetics, vol. 44, No. 1, Jan. 2008, pp. 125-131.
Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

* cited by examiner

MAGNETIC RECORDING WRITE HEAD WITH SELECTED WRITE GAP CURRENT DIRECTION FOR MINIMIZATION OF CROSS-TRACK INTERFERENCE

CROSS-REFERENCE TO RELATED APPLICATIONS

This application is a continuation of U.S. patent application Ser. No. 16/277,947, filed Feb. 15, 2019, which application is a continuation of U.S. patent application Ser. No. 16/191,330, filed Nov. 14, 2018, which application is a continuation of U.S. patent application Ser. No. 16/144,796, filed Sep. 27, 2018, which application claims benefit of U.S. Provisional Patent Application Ser. No. 62/580,697, filed Nov. 2, 2017, all of which are herein incorporated by reference.

BACKGROUND

Field of the Invention

This invention relates generally to magnetic recording systems, and more particularly to a magnetic recording system with a write head that utilizes electrical current through a conductive structure in the write gap to assist writing.

Description of the Related Art

Perpendicular magnetic recording (PMR) in magnetic recording hard disk drives, wherein the recorded bits are stored in a perpendicular or out-of-plane orientation in the magnetic recording layer of the disk, allows for ultra-high recording density, i.e., the areal density of the recorded bits on the disk. The write head must be able to write data not only at high bit density but also at high data rates. The write speed is particularly important in enterprise disk drives. However, the time for the main pole of the write head to switch from one magnetization direction to the other is a limiting factor as the data rate is increased. At high data rates, the available magnetic flux from the write head, as seen by the recording layer on the disk, is dominated by the low-frequency flux output of the write head. The reason for such loss of write flux includes a slow intrinsic time-constant of the magnetization reversal in the main pole of the write head.

Various techniques have been proposed to increase the magnetization switching speed of the perpendicular write head. One technique is current-assisted writing, wherein a separate electrical source directs current through a conductive structure near the write pole to generate a magnetic field that assists the magnetization reversal. U.S. Pat. No. 8,116,031 B2, assigned to the same assignee as this application, describes a write head with an auxiliary coil and current source that generates a magnetic field orthogonal to the write pole to apply a torque to the write pole magnetization and thereby facilitate magnetization switching. U.S. Pat. No. 7,072,142 B2, also assigned to the same assignee as this application, describes a write head with a magnetic bias field orthogonal to the magnetization of the write pole. The bias field may be generated by current in a separate electrical path adjacent the write pole and applies a torque to the write pole magnetization to facilitate switching.

In addition to the need for high write speed in PMR, there is a need to increase the areal density of the recorded bits on the disk. However, an increase in recording density requires a corresponding reduction in the size of the magnetic grains in the magnetic recording layer to achieve sufficient medium signal-to-noise ratio. As the size of the magnetic grains is reduced, the magnetocrystalline anisotropy of the magnetic grains must be increased to maintain adequate thermal stability. Simultaneously, the magnetic write field from the write head has to exceed the coercivity of the magnetic recording layer to achieve saturation digital recording, resulting in a conflicted limitation on the anisotropy of the magnetic grains.

Thus PMR systems have been proposed that use an electrically conductive spin-torque oscillator (STO) near the write pole. The STO may be located in the write gap between the write pole and a trailing shield of the write head, with the electrical current being directed through the write gap. In one type of system using a STO, called microwave-assisted magnetic recording (MAMR), a high frequency oscillatory auxiliary magnetic field from a ferromagnetic free layer or field generation layer (FGL) in the STO is applied to the magnetic grains of the recording layer. The auxiliary field may have a frequency close to the resonance frequency of the magnetic grains in the recording layer to facilitate the switching of the magnetization of the grains at lower write fields from the conventional write head than would otherwise be possible without assisted recording. Conversely, MAMR may be used to increase the coercivity of the magnetic recording layer above that which could be written to by a conventional PMR alone. The increase in coercivity afforded by MAMR allows for a reduction in the size of the magnetic grains and thus a corresponding increase in recording density. MAMR systems are described by J. G. Zhu et al., "Microwave Assisted Magnetic Recording", *IEEE Transactions on Magnetics*, Vol. 44, No. 1, January 2008, pp. 125-131; and in U.S. Pat. Nos. 7,982,996 B2 and 8,970,996 B2, both assigned to the same assignee as this application.

SUMMARY

A problem associated with magnetic recording write heads is cross-track interference (XTI). When the write head is writing on a desired data track, stray magnetic fields from the write head may affect other tracks, including adjacent tracks as well as tracks far from the track being written, resulting in XTI. This can result in data in these tracks being overwritten.

Magnetic recording write heads are required to have magnetic shields on each side of the write head in the cross-tack direction, primarily to minimize XTI. However, these shields have an inherent magnetization in the cross-track direction, which is acquired during manufacturing.

Embodiments of this invention relate to a magnetic recording write head wherein an electrically-conductive structure is in the write gap between the write pole and the trailing shield and electrical current is directed through the write gap. The current through the electrically-conductive structure generates a circular Ampere field which, at the disk-facing end of the write pole, is substantially parallel to the disk-facing end of the write pole.

As part of the development of embodiments of this invention it has been discovered that in certain cases a write head with an electrically-conductive structure in the write gap and current through the write gap can produce XTI. The presence or absence of XTI depends on the relationship between the direction of magnetization of the write head side shields and the direction of current through the electrically-conductive structure in the write gap.

In embodiments of this invention the current direction through the electrically-conductive structure in the write gap is selected so that the generated Ampere field at the write pole end is in substantially the same direction as the magnetization direction of the write head side shields, which results in minimization of XTI.

In some embodiments the electrically-conductive structure in the write gap may be an electrically-conductive layer that is not part of a STO, and there is no STO in the write gap. In such embodiments the Ampere field primarily assists magnetization reversal of the write pole. In other embodiments the electrically-conductive structure in the write gap may be a STO. In such embodiments the current through the STO also generates an Ampere field, but this is in addition to an oscillatory auxiliary magnetic field generated by the STO.

For a fuller understanding of the nature and advantages of the present invention, reference should be made to the following detailed description taken together with the accompanying figures.

DETAILED DESCRIPTION

Figure 1:
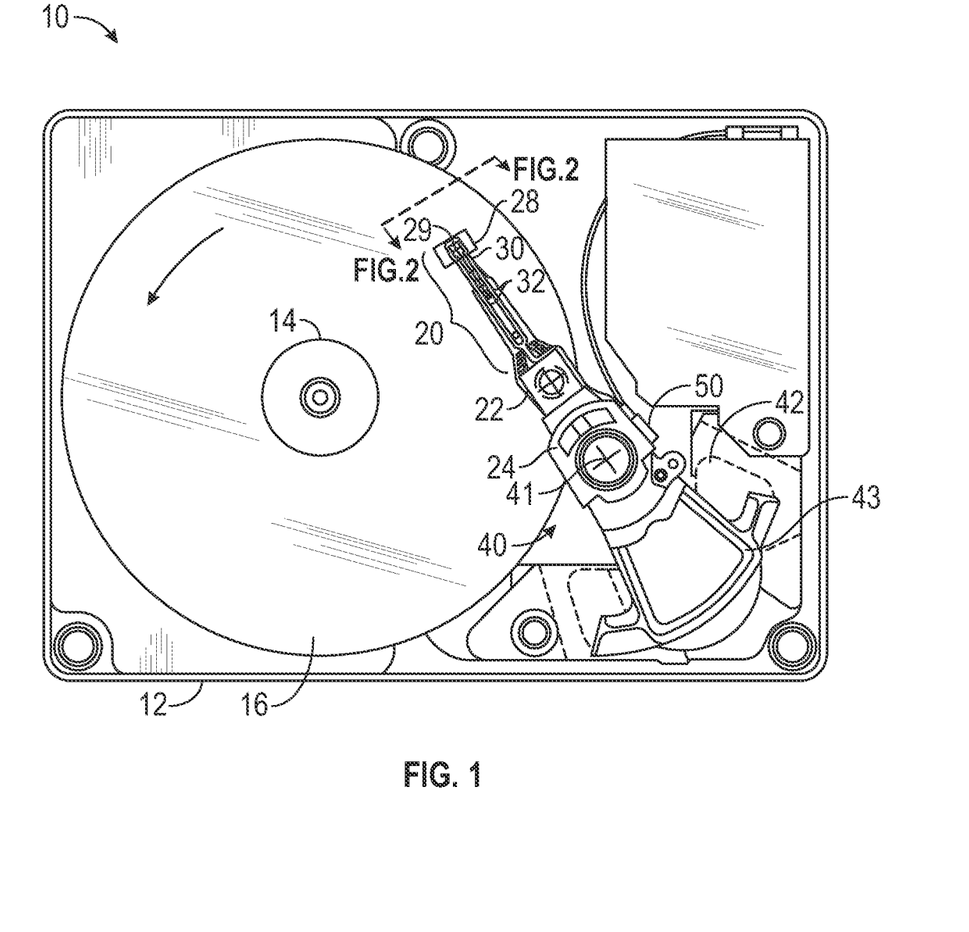
FIG. 1 is a top plan view of a conventional head/disk assembly of a hard disk drive with the cover removed that may function as a magnetic recording disk drive according to embodiments of the invention.

FIG. 1 is a top plan view of a conventional head/disk assembly of a hard disk drive with the cover removed that may function as a magnetic recording disk drive according to embodiments of the invention. The disk drive 10 includes a rigid base 12 supporting a spindle 14 that supports a stack of disks, including top disk 16. The spindle 14 is rotated by a spindle motor (not shown) for rotating the disks in the direction shown by curved arrow on disk 16. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to a gas-bearing slider 28. A magnetic recording read/write head 29 is located at the end or trailing surface of slider 28. In embodiments of this invention the write head 29 incorporates an electrically-conductive structure in the write gap. The flexure 30 enables the slider 28 to "pitch" and "roll" on a gas-bearing (typically air or helium) generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2A:
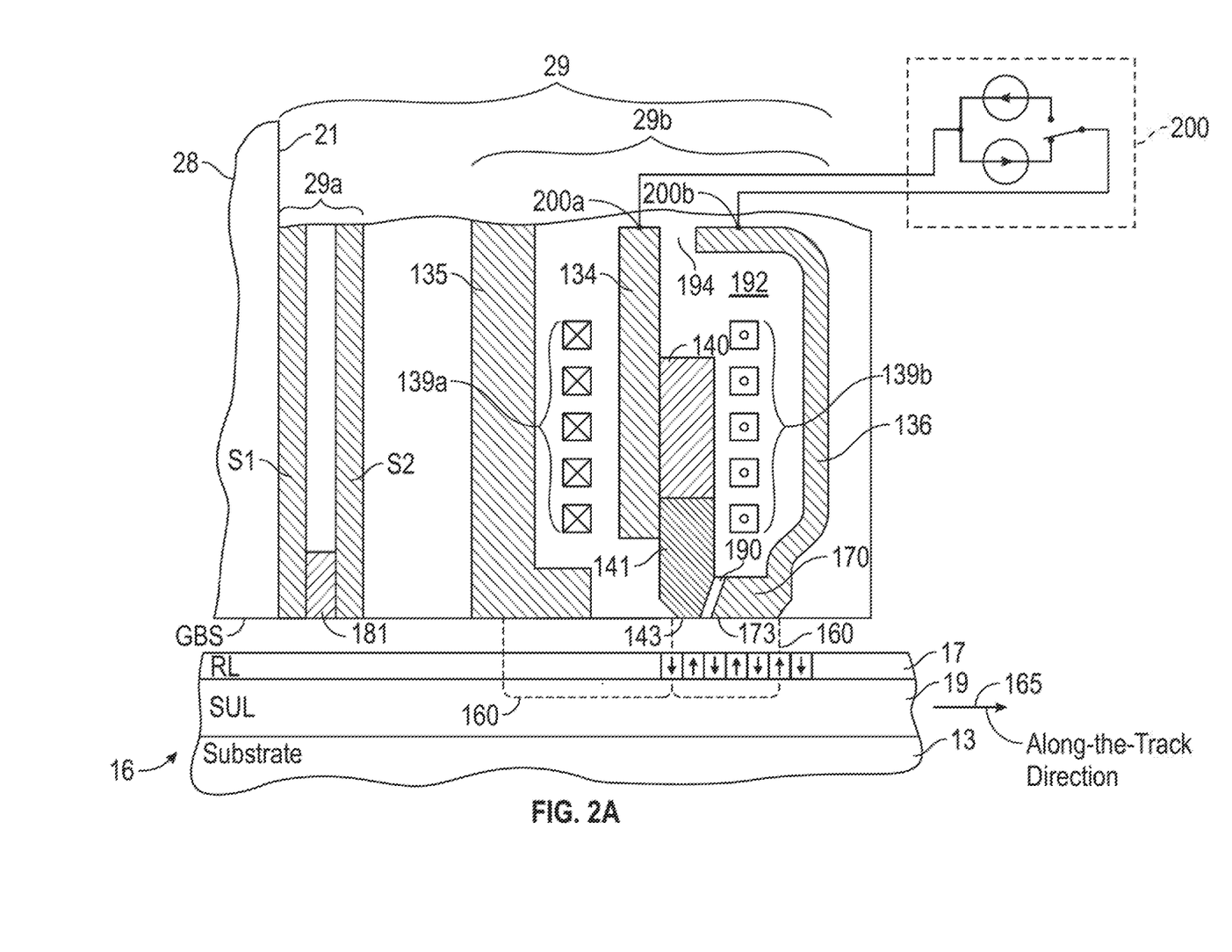
FIG. 2A is a side sectional view (not to scale) of a perpendicular magnetic recording write head with a non-magnetic electrically-conductive structure incorporated in the write gap according to embodiments of the invention, a read head and a recording disk taken through a central plane that intersects a data track on the disk.

FIG. 2A is a side sectional view (not to scale) of a perpendicular magnetic recording write head with an electrically-conductive structure 190 incorporated in the write gap, a read head and a recording disk taken through a central plane that intersects a data track on the disk. As shown in FIG. 2A, a "dual-layer" disk 16 includes a perpendicular magnetic data recording layer (RL) 17 on a "soft" or relatively low-coercivity magnetically permeable underlayer (SUL) 19 formed on the disk substrate 13. The read/write head 29 is formed on slider 28 that has a disk-facing or gas-bearing surface (GBS) and includes read head 29a and write head 29b. Read head 29a includes a magnetoresistive (MR) read element or sensor 181 located between two along-the-track magnetic shields S1, S2. The write head 29b is a perpendicular magnetic recording (PMR) write head and includes a yoke structure with main pole 134, write pole 140 with flared portion 141 and disk-facing end 143, optional first flux return pole 135, second flux return pole 136, trailing magnetic shield 170 with disk-facing end 173, and electrically-conductive structure 190 in the write gap between write pole end 143 and trailing shield end 173. The main pole 134, write pole 140, return poles 135, 136 and trailing shield 170 are formed of ferromagnetic materials, typically alloys of one or more of Co, Fe and Ni. The write pole 140 is typically formed of a high-moment CoFe alloy.

The electrically-conductive structure 190 may be a conductive layer that is not part of a STO for generating an Ampere field to assist switching of the write pole magnetization. Such a conductive layer may be formed of a nonmagnetic metal like Cu, Au, Ru, Cr, W, Mo, Pt or Rh or their alloys. It is preferably non-magnetic, and if it is the only layer in the write gap it is required to be non-magnetic. Alternatively, the electrically-conductive structure 190 may be a STO that generates a high frequency oscillatory auxiliary magnetic field.

The write head 29b also includes a thin film coil 139a, 139b shown in section around main pole 134. The write coil 139a, 139b is a helical coil wrapped around main pole 134, but the write coil may also be a conventional dual "pancake" coil in which all the coil sections are in substantially the same plane and wrapped around the yoke. A flared write pole 140 is part of the main pole 134 and has a flared portion 141 and a pole tip with an end 143 that faces the outer surface of disk 16. Write current through coil 139a, 139b induces a magnetic field (shown by dashed line 160) from the write pole 140 that passes through the RL 17 (to magnetize the region of the RL 17 beneath the write pole end 143), through the flux return path provided by the SUL 19, and back to the end of optional first return pole 135 and end 173 of trailing shield 170.

The write head 29b also includes electrical circuitry 200 electrically connected to the main pole 134 and the second return pole 136. The circuitry 200 may include a voltage or current source (or a connection to an external voltage or current source) and one or more switching devices, such as transistors or relays that can switch the voltage or current on and off. The circuitry 200 is configured to provide a current or voltage to the main pole 134 and the return pole 136. For example, the circuitry 200 may provide a current between the main pole 134 and the return pole 136/trailing shield 170 that flows through write pole 141 and conductive structure 190 in the write gap between the write pole 141 and trailing shield 170. The current through conductive structure 190 generates an Ampere field. An insulating material portion 192 (for example alumina) is provided around the magnetic coil between the main pole 134, the trailing shield 170 and the return pole 136. An electrically insulating material layer 194 (for example alumina) can be provided between end portions of the main pole 134 and the return pole 136 where the circuitry connections (i.e., electrical contacts 200a, 200b attached to the ends of the main pole 134 and return pole 136, respectively) are made (i.e., distal from the GBS).

The read/write head 29 is typically formed as a series of thin films deposited on a trailing surface 21 of gas-bearing slider 28 that has its GBS supported above the surface of disk 16. The MR read head 29a is comprised of MR sensor 181 located between MR shields S1 and S2 and is deposited on the trailing end 21 of the slider 28 prior to the deposition of the layers making up the write head 29b. In FIG. 2A, the disk 16 moves past the write head 29b in the along-the-track direction indicated by arrow 165, so the portion of slider 28 that supports the read head 29a and write head 29b is often called the slider "trailing" end, and the surface 21 perpendicular to the slider GBS on which the write head 29b is located is often called the slider "trailing" surface.

The RL 17 is illustrated with perpendicularly recorded or magnetized regions, with adjacent regions having opposite magnetization directions, as represented by the arrows. The magnetic transitions between adjacent oppositely-directed magnetized regions are detectable by the MR sensor 181 as the recorded bits. When the MR sensor 181 is aligned with the desired track being read, the shields S1, S2 prevent the MR sensor 181 from detecting bits in the desired track other than the bit intended to be detected.

Figure 2B:
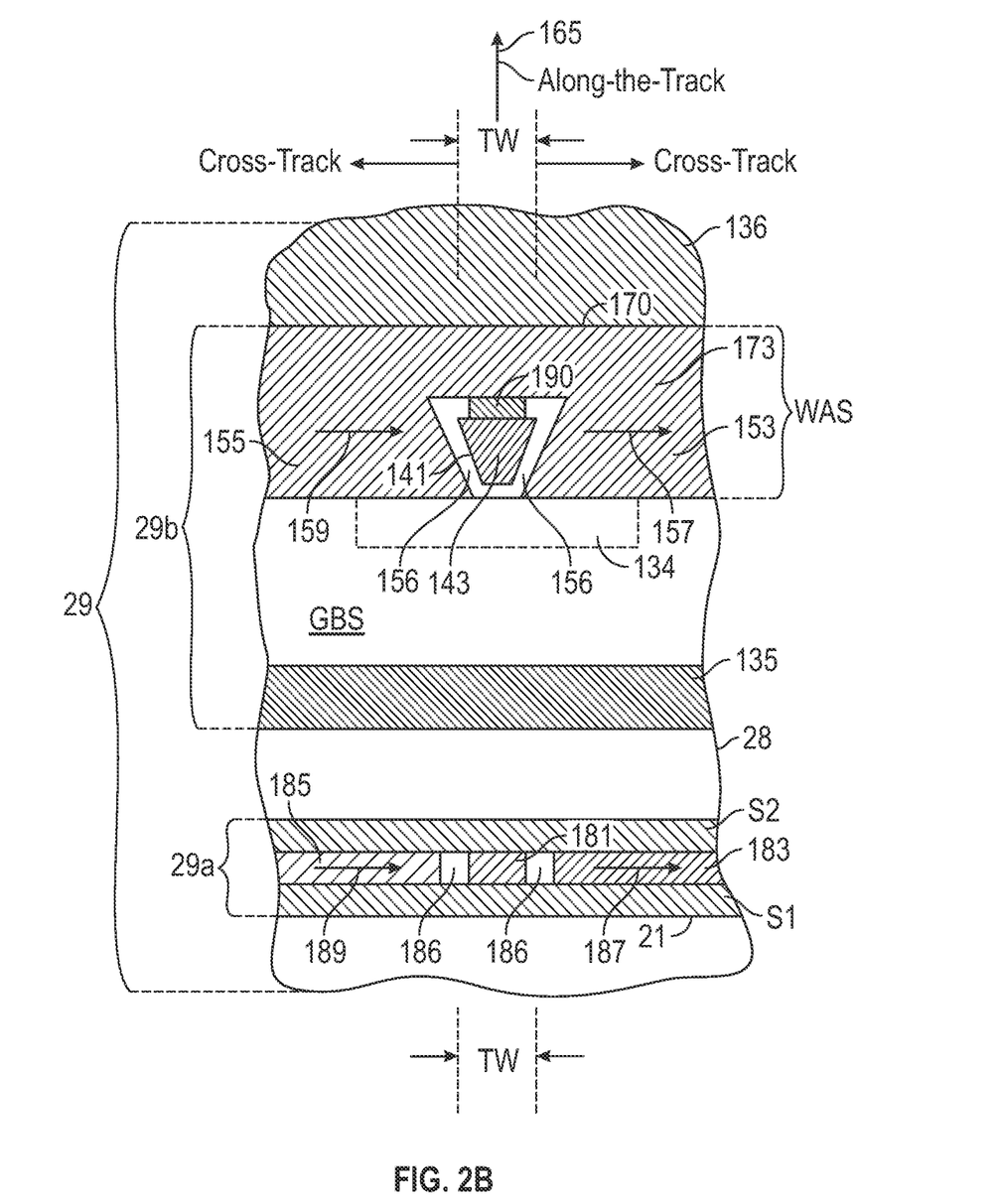
FIG. 2B is a view (not to scale) that illustrates the read head and write head according to embodiments of the invention as seen from the disk.

FIG. 2B is a view (not to scale) that illustrates the read head 29a and write head 29b as seen from the disk 16. The GBS is the recording-layer-facing surface of the slider 28 that faces the disk 16 (FIG. 2A) and is shown without the thin protective overcoat typically present in an actual slider. The recording-layer-facing surface shall mean the surface of the slider 28 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The disk 16 (FIG. 2A) moves relative to the read/write head 29 in the direction 165, which is called the along-the-track direction. The direction perpendicular to direction 165 and parallel to the plane of the GBS is called the cross-track direction. The width of the end 143 of write pole 141 in the cross-track direction substantially defines the track-width (TW) of the data tracks in the RL 17 (FIG. 2A). The main pole 134 is shown with dashed lines because it is recessed from the GBS (see FIG. 2A).

In FIG. 2B, the portions identified as 153, 155 on opposite ends of trailing shield 170 are side shields that together with trailing shield 170 form a wraparound shield (WAS) that generally surrounds the write pole end 143. The shields 170, 153, 155 all have ends substantially at the recording-layer-facing surface, as shown by trailing shield end 173. The shields 170, 153, 155 are formed as a single-piece structure to form the WAS that substantially surrounds the write pole end 143 and are thus formed of the same material, typically a NiFe, CoFe or NiFeCo alloy, so that they have the same alloy composition. The side shields 153, 155 are separated from write pole end 143 by nonmagnetic electrically-insulative gap material 156. The non-magnetic electrically-conductive structure 190 is in the write gap between the write pole end 143 and the trailing shield 170. The WAS alters the angle of the write field and improves the write field gradient at the point of writing, and shields the writing field at regions of the RL away from the track being written. The WAS is shown as connected to the return pole 136. However, the WAS may be a "floating" WAS shield not connected to either the return pole 136 or other portions of the yoke by flux-conducting material. Also, instead of a WAS, the write head 29b may have separate side shields not connected to the trailing shield 170, and the separate shields may be formed of the same or different ferromagnetic materials. Also, an optional leading shield (not shown) may be connected to the side shields at the leading end of the write head 29b.

In FIG. 2B, the portions identified as 183, 185 on opposite sides of MR sensor 181 are cross-track magnetic side shields. They are separated from MR sensor 181 by electrically-insulative material 186. The side shields 183, 185 prevent the MR sensor 181 from detecting bits in tracks adjacent to the track being read. The MR sensor 181 is required to have a generally cross-track magnetization in the absence of an applied magnetic field, i.e., when no bits are being detected. Thus during fabrication of the read/write head 29 the structure is subjected to a magnetic field that sets or initializes the side shields 183, 185 to have a cross-track magnetization, as shown by arrows 187, 189 respectively. The magnetic field from the side shields 183, 185 biases the magnetization of the MR sensor 181 so that is in substantially the cross-track direction in the absence of an applied magnetic field. Because the write head side shields 153, 155 are also formed of ferromagnetic material they will also become magnetized during the initialization step. This results in the write head side shields 153, 155 also having cross-track magnetizations 157, 159 respectively.

Figure 3A:
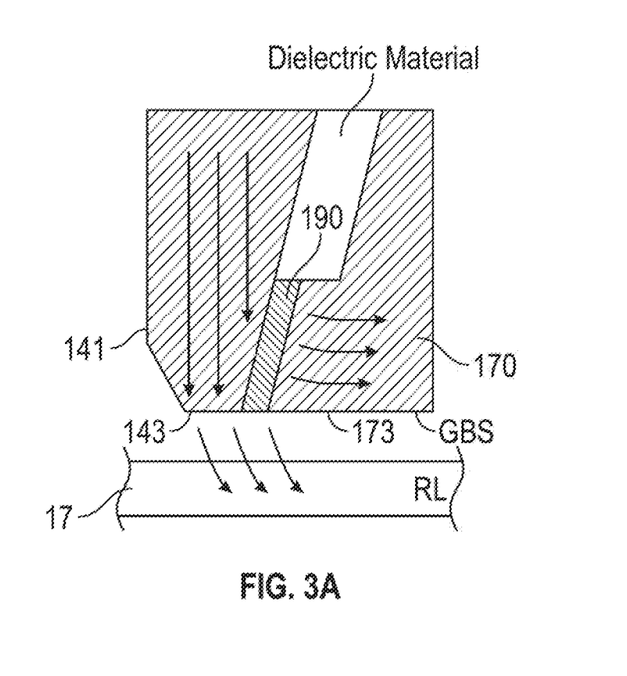
FIG. 3A is an illustration of the magnetic flux lines from the write field in the write pole that are directed substantially perpendicularly toward the recording layer and through the trailing shield when write current is directed through the write coil.
Figure 3B:
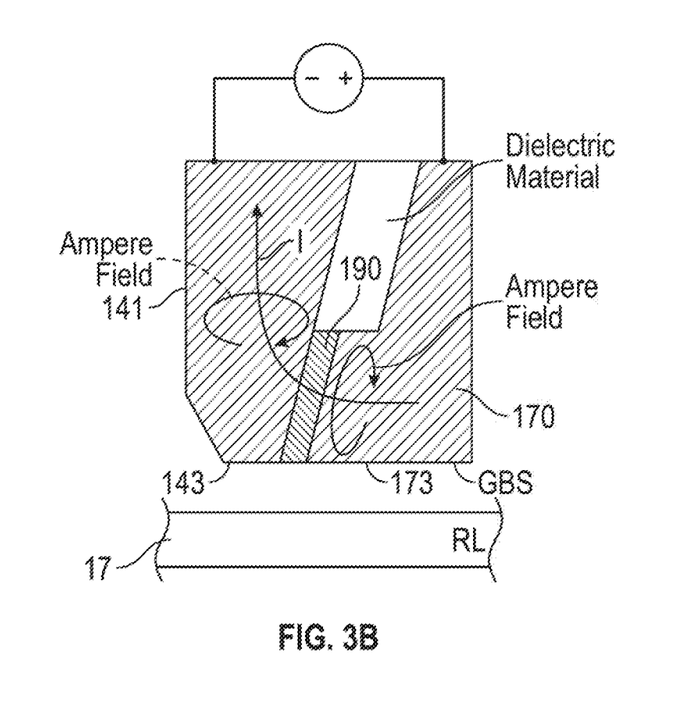
FIG. 3B is an illustration of the electrical current from the trailing shield through the electrically-conductive structure in the write gap to the write pole that generates an Ampere field.

The general operation of the write head with an electrically-conductive structure in the write gap will be explained with the side sectional views of FIGS. 3A-3B. In FIG. 3A, magnetic flux in write pole 141 is directed substantially perpendicularly toward the RL 17 and into the trailing shield 170 when write current is directed through coil 139a, 139b (FIG. 2A). The arrows in FIG. 3A represent the magnetic flux inside the write pole 141 and the magnetic field produced by the write pole 141 that emits from the write pole 141 into RL 17. Simultaneously, as shown in FIG. 3B, electrical current from circuitry 200 (FIG. 2A) passes from trailing shield 170 through conductive structure 190 to write pole 141 (or alternatively from write pole 141 to trailing shield 170). According to Ampere's law, this current will produce a circular magnetic field, as shown by the circular arrows, that is in the direction substantially transverse to the direction of current flow.

In the embodiment of FIG. 3B, it is assumed that conductive structure 190 is a conductive layer that is not part of a STO and that there is no STO in the write gap. Thus the purpose of the conductive layer 190 is primarily to generate the Ampere field to assist the switching of the magnetization of the write pole 141. Since the current direction is in substantially the same direction as the magnetic flux, or the magnetization in write pole 141, this Ampere field is also transverse to the magnetization of the write pole 141. This produces a transverse magnetization component with respect to the flux flow direction in the write pole 141. This creates a torque on the write pole magnetization that makes the flux reversal in the write pole faster. This increase in magnetization reversal or switching speed of the write pole, which is required for high-speed writing, enables an increase in disk areal data density. In one example, the height of conductive structure 190 (the distance from the GBS to the dielectric material) may be 60-150 nm and the thickness may be 10-40 nm. For these ranges of dimensions for the conductive structure 190, and with current through the conductive structure 190 in the range of 10 to 50 mA, an Ampere field in the range of 50 to 500 Oe can be generated.

Figure 4:
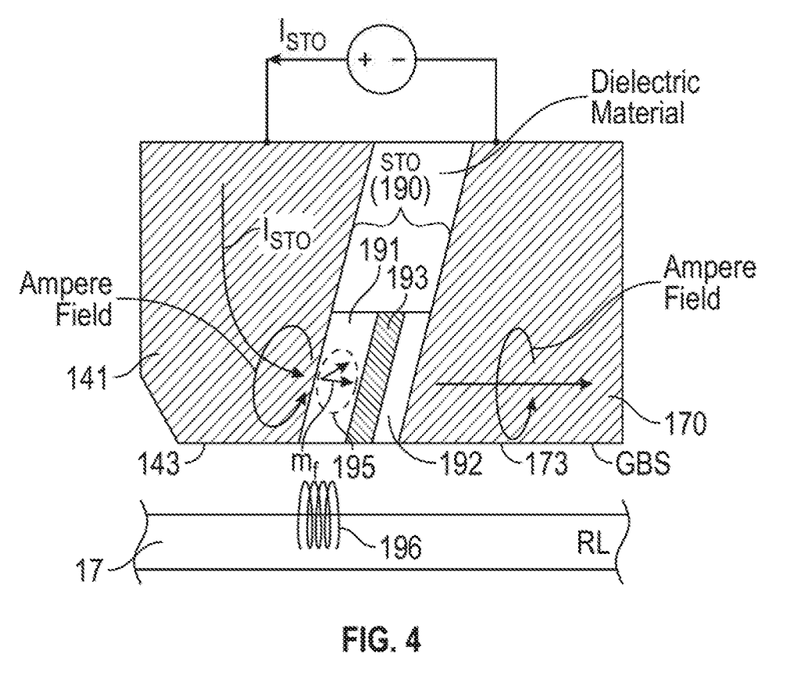
FIG. 4 is a side sectional view of a write head with a spin-torque oscillator (STO) as the electrically-conductive structure in the write gap between the write pole and the trailing shield.

However, in an embodiment where conductive structure 190 is an STO, the current through the conductive structure also generates an Ampere field, but this is in addition to an oscillatory auxiliary magnetic field. This is depicted in FIG. 4, which is a side sectional view of a write head with a spin-torque oscillator (STO) 190 as the electrically-conductive structure in the write gap between the write pole 141 and the trailing shield 170. The STO includes ferromagnetic free layer or field generation layer (FGL) 191, ferromagnetic spin-polarizing layer (SPL) 192 and a nonmagnetic spacer layer 193 between the FGL 191 and the SPL 192. The nonmagnetic spacer layer 193 is typically formed of a material with a long spin-diffusion length, like Cu or other materials like Au, Ag or AgSn. During writing, the STO electrical circuitry provides DC current $I_{STO}$ between the write pole 141 and the trailing shield 170. The FGL 191 has an edge substantially at the GBS and has a magnetization ($m_f$). FGL 191 may be formed of high moment ferromagnetic materials such as CoFe alloys.

In operation of the STO 190, DC current ($I_{STO}$), with a current density J above a critical value $J_C$, is applied across write pole 141 and trailing shield 170. The flow of electrons is by convention in the opposite direction, i.e., from the trailing shield 170 through SPL 192 to FGL 191. The electrons become spin polarized by SPL 192 and apply a direct spin torque on FGL 191. Direct and reflected spin-polarized electrons apply a spin torque on the magnetization $m_f$ of the FGL 191. This induces a precessional motion of the magnetization $m_f$ of FGL 191, as depicted by the oval 195 that represents a circular precessional motion of the tip of the magnetization vector $m_f$. The frequency of precession depends on the properties and thicknesses of the materials making up the STO 190. The precession of the FGL 191 magnetization $m_f$ applies an oscillatory auxiliary ac field 196 to the magnetic grains of the RL 17. This results in microwave-assisted magnetic recording (MAMR), which improves the switching of the magnetization of the grains in the RL 17, with the improvement depending on the frequency at which the auxiliary field is applied. However, even if the oscillatory auxiliary magnetic field from the FGL 191 does not provide microwave assistance to writing, the FGL can have a DC field component that will assist writing by the conventional write head.

Figure 5:
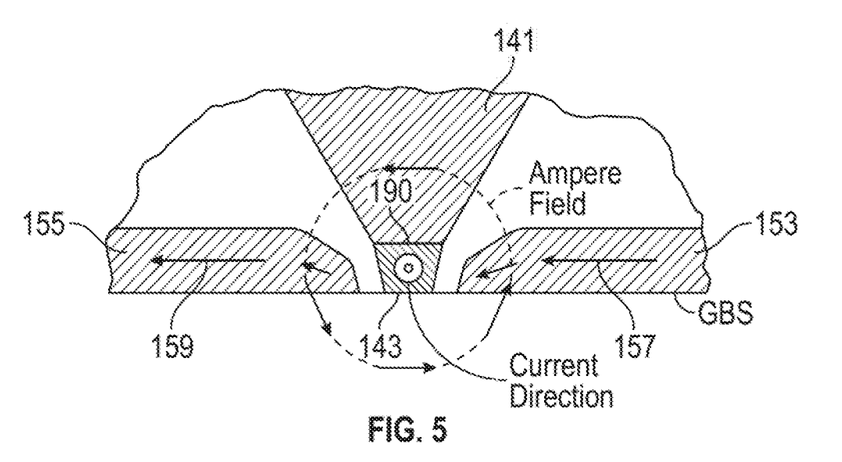
FIG. 5 is a view of a sectional plane of the write head showing the conductive structure, write pole and side shields as seen from the trailing shield for a write head that creates cross-track interference (XTI).
Figure 6:
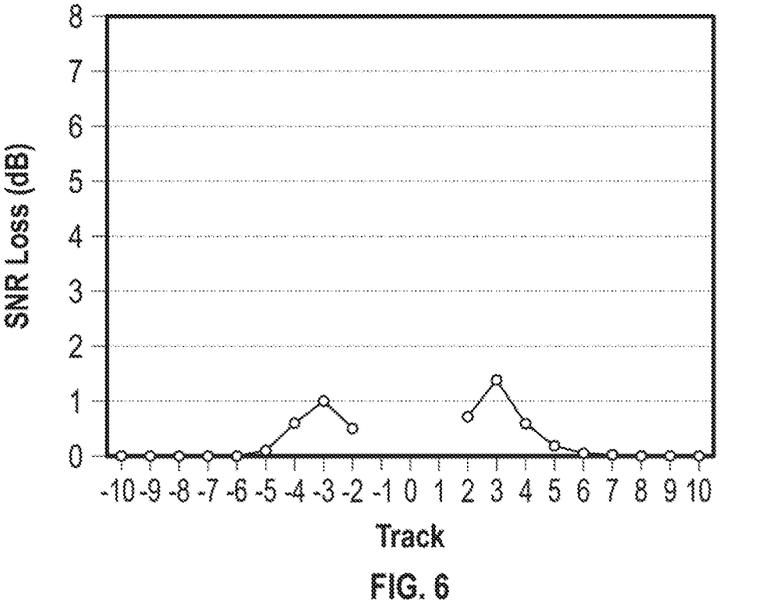
FIG. 6 is a graph of signal loss for certain tracks on either side of track 0 from a XTI test for the write head of FIG. 5.

A problem associated with magnetic recording write heads is cross-track interference (XTI). When the write head is writing on a desired data track, stray magnetic fields from the write head may affect other tracks, including adjacent tracks as well as tracks far from the track being written, resulting in XTI. This can result in data in these tracks being overwritten. As part of the development of embodiments of this invention it has been discovered that in certain cases a write head with an electrically-conductive structure in the write gap and current through the write gap can produce undesirable XTI. The presence or absence of XTI depends on the relationship between the direction of magnetization of the write head side shields and the direction of current through the conductive structure in the write gap. This is depicted in FIG. 5, which is a view from the trailing shield of a sectional plane substantially parallel to the conductive structure. The current through conductive structure 190 is in a direction out of the paper, as shown by the arrow head. This results in a counterclockwise Ampere field where the field at the write pole end 143 near the GBS is substantially parallel to the GBS and points to the right. However, this direction is opposite or substantially antiparallel to the direction of magnetization 157, 159 of write head side shields 153, 155 respectively. In this case the write head generates XTI. FIG. 6 is a graph of signal-to-noise ratio (SNR) loss measured for a number of tracks on either side of track 0 from a test for XTI. A predetermined pattern is first written on each track, for example from track −10 to track +10, track 0 is then repeatedly overwritten, and then each previously written track is read back and the signal loss of the predetermined pattern is measured for each track. FIG. 6 shows a reduction in SNR (signal loss from the previously recorded pattern), which is due to XTI that occurred when track 0 was overwritten, at tracks between about −2 to −5 and about +2 to +5.

Figure 7:
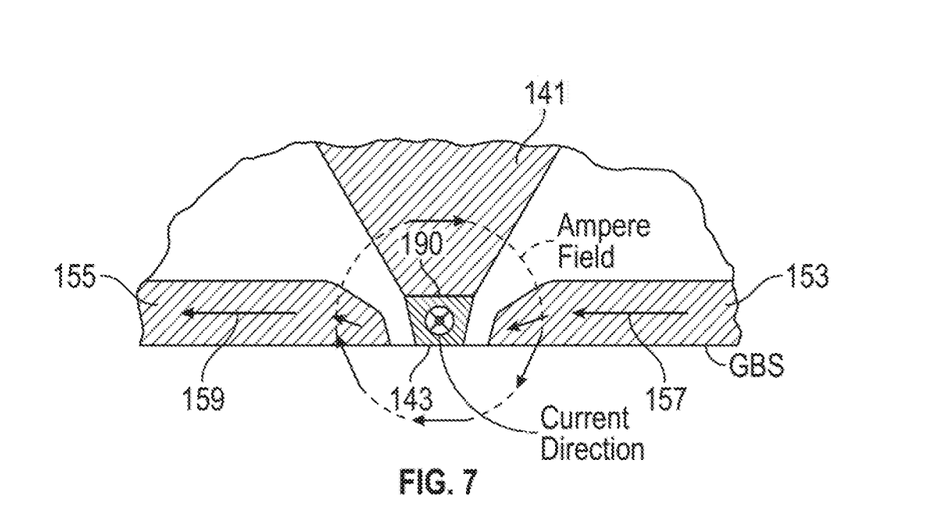
FIG. 7 is a view like that of FIG. 5 for an embodiment of the invention wherein the Ampere field at the write pole end is substantially parallel to the direction of magnetization of the write head side shields.
Figure 8:
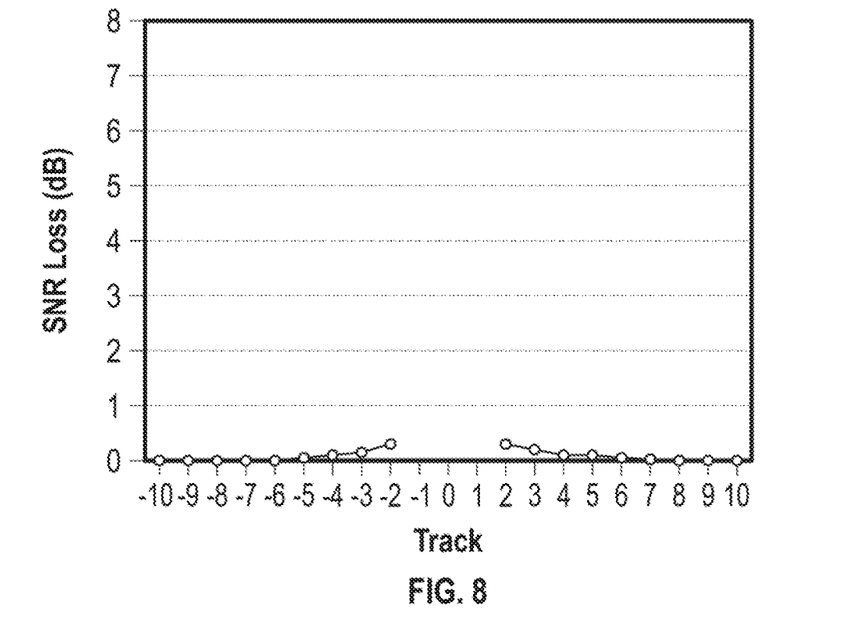
FIG. 8 is a graph of signal loss for certain tracks on either side of track 0 from a XTI test for the write head of FIG. 7.
Figure 9:
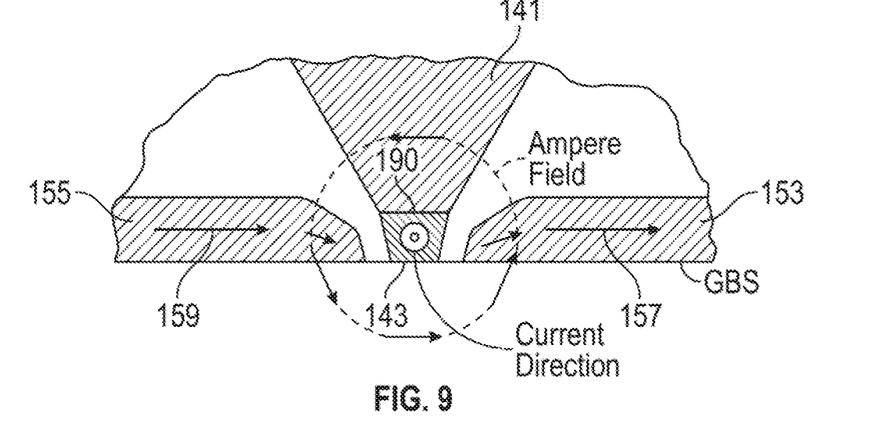
FIG. 9 is a view like that of FIG. 5 for an embodiment of the invention wherein the current direction, the Ampere field at the write pole end and the direction of magnetization of the write head side shields are opposite to their respective directions in the embodiment of FIG. 7.

However, if the current direction through conductive structure 190 is reversed so that the Ampere field is clockwise, where the field at the write pole end 143 near the GBS is substantially parallel to the GBS and points to the left, as shown by the arrow tail in FIG. 7, XTI is substantially reduced. This direction is substantially parallel to the direction of magnetization 157, 159 of write head side shields 153, 155 respectively. FIG. 8, which is data from the same type of test as described for FIG. 6, shows essentially the absence of XTI for this embodiment. Thus in embodiments of this invention the current direction through the conductive structure in the write gap is selected so that the generated Ampere field at the write pole end is in substantially the same direction as the magnetization direction of the write head side shields, as depicted in FIG. 7. Thus in addition to the embodiment of FIG. 7, another preferred embodiment is depicted in FIG. 9, wherein the magnetizations 157, 159 and the current direction are in the opposite directions to their respective directions depicted in FIG. 7.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording write head, the write head comprising:
    a write pole having an end disposed at a gas bearing surface (GBS);
    a trailing shield, the write pole and trailing shield spaced apart to define a write gap;
    an electrically-conductive structure disposed in the write gap, wherein the magnetic recording write head is configured to direct current through the electrically-conductive structure to generate an Ampere field; and
    a pair of side shields, the side shields being disposed on opposite sides of the write pole on a cross-track line, the side shields having a magnetization in a substantially cross-track direction, wherein the generated Ampere field is in substantially the same direction as the magnetization of the side shields.

2. The head of claim 1 wherein the electrically-conductive structure comprises an electrically-conductive layer.

3. The head of claim 2 wherein the conductive layer comprises a material selected from Cu, Au, Ru, Cr, W, Mo, Pt, Rh and alloys thereof.

4. The head of claim 1 wherein the electrically-conductive structure comprises a spin-torque oscillator (STO).

5. The head of claim 4 wherein the STO is configured to provide an oscillatory auxiliary magnetic field in the presence of current through the STO, and further comprising electrical circuitry connected to the write pole and the trailing shield.

6. The head of claim 4 wherein the STO comprises a ferromagnetic field generation layer (FGL), a ferromagnetic spin-polarizing layer (SPL), and a nonmagnetic spacer layer between the FGL and SPL, and further comprising electrical circuitry connected to the write pole and the trailing shield.

7. The head of claim 6 wherein the FGL is configured to provide microwave-assisted magnetic recording to a recording layer in the presence of current through the STO.

8. The head of claim 1 further comprising an electrically conductive coil coupled to the write pole, the write pole configured to generate a magnetic write field in the presence of electrical write current through the coil.

9. The head of claim 8 further comprising electrical circuitry connected to the write pole and the trailing shield for directing current through the electrically-conductive structure in the write gap.

10. A magnetic recording disk drive comprising:
    the write head of claim 9; and
    a rotatable magnetic recording disk having a perpendicular magnetic recording layer with data tracks.

11. A magnetic recording disk drive write head for magnetizing regions in data tracks of a magnetic recording layer on a disk, the write head being formed on a slider having a gas-bearing surface (GBS), the write head comprising:
    a write pole having an end substantially at the GBS;
    a trailing shield having an end substantially at the GBS, the write pole end and trailing shield end being spaced apart to define a write gap, wherein an along-the-track line on the write head is a line substantially orthogonal to the gap and substantially parallel to the GBS, and a cross-track line on the write head is a line substantially orthogonal to the along-the-track line and substantially parallel to the GBS;
    an electrically-conductive layer in the write gap, wherein there is no spin-torque oscillator (STO) in the write gap;
    a pair of ferromagnetic side shields, the side shields disposed on opposite sides of the write pole end on the cross-track line, the side shields having a magnetization in a substantially cross-track direction; and
    an electrical circuit coupled to the write pole and the trailing shield for directing current through the conductive layer in the write gap to generate an Ampere field in substantially the same direction as the magnetization of the side shields.

12. The head of claim 11 wherein the electrically-conductive layer comprises a material selected from Cu, Au, Ru, Cr, W, Mo, Pt, Rh and alloys thereof.

13. The head of claim 11 further comprising a return pole formed of ferromagnetic electrically-conductive material and coupled to the trailing shield, and an electrical coil coupled to the write pole and return pole for generating a magnetic write field in the write pole.

14. A magnetic recording disk drive comprising:
    the write head of claim 13; and
    a rotatable magnetic recording disk having a perpendicular magnetic recording layer with data tracks.

15. A magnetic recording disk drive write head for magnetizing regions in data tracks of a magnetic recording layer on a disk, the write head being formed on a slider having a gas-bearing surface (GBS), the write head comprising:
    a write pole having an end substantially at the GBS;
    a trailing shield having an end substantially at the GBS, the write pole end and trailing shield end being spaced apart to define a write gap, wherein an along-the-track line on the write head is a line substantially orthogonal to the gap and substantially parallel to the GBS, and a cross-track line on the write head is a line substantially orthogonal to the along-the-track line and substantially parallel to the GBS;
    a spin-torque oscillator (STO) in the write gap;
    a pair of ferromagnetic side shields, the side shields disposed on opposite sides of the write pole end on the cross-track line, the side shields having a magnetization in a substantially cross-track direction; and
    an electrical circuit coupled to the write pole and the trailing shield for directing current through the STO in the write gap to generate an Ampere field in substantially the same direction as the magnetization of the side shields.

16. The head of claim 15 wherein the STO is configured to provide an oscillatory auxiliary magnetic field in the presence of current through the STO.

17. The head of claim 15 wherein the STO comprises a ferromagnetic field generation layer (FGL), a ferromagnetic spin-polarizing layer (SPL), and a nonmagnetic spacer layer between the FGL and SPL.

18. The head of claim 17 wherein the FGL is configured to provide microwave-assisted magnetic recording to the recording layer in the presence of current through the STO.

19. The head of claim 15 further comprising a return pole formed of ferromagnetic electrically-conductive material and coupled to the trailing shield, and an electrical coil coupled to the write pole and return pole for generating a magnetic write field in the write pole.

20. A magnetic recording disk drive comprising:
the write head of claim 19; and
a rotatable magnetic recording disk having a perpendicular magnetic recording layer with data tracks.

* * * * *